United States Patent [19]
Marchand

[11] Patent Number: 5,945,358
[45] Date of Patent: Aug. 31, 1999

[54] PAPERMAKERS FABRIC HAVING SPUN BONDED REINFORCEMENT

[75] Inventor: René Marchand, Raleigh, N.C.

[73] Assignee: Weavexx Corporation, Wake Forest, N.C.

[21] Appl. No.: 08/594,837

[22] Filed: Jan. 31, 1996

[51] Int. Cl.[6] .................................. B32B 5/06; B32B 7/08
[52] U.S. Cl. ........................ 442/240; 442/245; 442/247; 442/270; 442/271; 442/275; 442/326; 442/383; 442/388; 442/401; 442/402; 442/409; 28/107; 28/110
[58] Field of Search ..................... 428/286, 300; 162/900; 442/240, 245, 247, 270, 271, 275, 326, 383, 388, 401, 402, 409; 28/107, 110

[56] References Cited
U.S. PATENT DOCUMENTS 4,851,281  7/1989  Wood .
5,372,876  12/1994  Johnson et al. ......................... 428/233

*Primary Examiner*—Marion McCamish
*Assistant Examiner*—Ula Ruddock
*Attorney, Agent, or Firm*—Myers Bigel Sibley & Sajovec

[57] ABSTRACT

A papermaker's fabric is provided having a spun bonded reinforcement. A layer of spun bonded material may be placed in any one of a number of possible locations in the fabric, depending upon the felt stratification desired. For example, it may be attached to the upper surface (or paper contacting side) of the base fabric layer; to the lower surface (or machine contacting side) of the base fabric layer; between two base fabric layers, in the case of a laminated felt; between layers of fibers; or in any other desired location. The spun bonded material may be attached through the use of needling or by use of adhesives, low melts, or ultrasonic methods.

20 Claims, 5 Drawing Sheets

PAPERMAKERS FABRIC HAVING SPUN BONDED REINFORCEMENT

BACKGROUND OF THE INVENTION

The field of the invention is felts for use in a papermaking machine, and more particularly, press felts for use in the press section of a papermaking machine.

In the conventional papermaking process, a water slurry or suspension of cellulose fibers, known as the paper "stock", is fed onto the top of the upper run of a traveling endless forming belt. The forming belt provides a papermaking surface and operates as a filter to separate the cellulosic fibers from the aqueous medium to form a wet paper web. In forming the paper web, the forming belt serves as a filter element to separate the aqueous medium from the cellulosic fibers by providing for the drainage of the aqueous medium through its mesh openings, also known as drainage holes, by vacuum means or the like located on the drainage side of the fabric.

After leaving the forming medium, the somewhat self-supporting paper web is transferred to the press section in the machine and onto a press felt, where still more of its water content is removed by passing it through a series of pressure nips formed by cooperating press rolls, these press rolls serving to compact the web as well. It is this press felt which is the subject of the present invention.

Subsequently, the paper web is transferred to a dryer section where it is passed about and held in heat transfer relation with a series of heated generally cylindrical rolls to remove still further amounts of water therefrom.

Ideally, press felts should have at least the following properties. First, they should have a top surface that is fine enough to produce a smooth finish and minimize marking of the sheet of paper being produced. Second, they should be open enough to allow water to drain through without significant impedance. Third, they should be resilient enough to quickly recover from repeated high nip pressures over a long period of time. Fourth, they should be tough and strong enough to provide good stability, wear resistance and felt life.

Generally, press felts are assembled in the following manner. If the fabrics are not woven endless, the ends are joined by stitching a seam in a conventional manner. The base fabric is then installed on a needle loom, with the fine layer comprising the outside or top loop, where multilayer base fabrics are employed. Batt fibers are applied to the top side or paper contacting surface, in sufficient quantity and weight to give good bulk and cushion properties. The fibers are anchored to the base fabric assembly by one or more needling operations. Thus, the surface of the press felt (top) which contacts the paper web is a felt, formed as the batting material fibers are needled to the base fabric. Fibers may also be needled to the bottom of the woven base fabric to ensure good anchoring of the fibers on the top side.

Needling the entire structure gives the felt a uniform thickness. Needling also provides a cushioned absorbency to the felt and distributes the pressure uniformly across the width of the felt for efficient water removal. Both uniform thickness and pressure distribution significantly reduce or eliminate vibration of the press rolls of the papermaking machine. Needling is necessary to compress the felt to a given density and resiliency and to entangle the fibers in the base fabric so they do not come loose during the papermaking operation. The batt material may be made up of fibers of any of a number of well known compositions, including natural fibers such as wool, but preferably will be made in whole or in part from synthetic materials such as nylon, dacron, etc. In this connection, it is desirable that these fibers be relatively coarse or of large diameter. They will be selected for their stiffness, or "rigidity"; that is their tendency to resist bending or deformation at fiber cross-over points since this enhances their ability to produce a good papermaking surface.

As noted above, the felt should be strong enough to provide good stability, wear resistance, and fabric life. One of the problems with existing felts is that the batt fibers are soft and do not make a strong fabric. Furthermore, the fabrics tend to shift and/or widen on the machine, making it very difficult to predict how a fabric will perform on the press roll. This is a particular problem with fibers made of nylon, since nylon tends to expand upon exposure to water.

Thus, it is an object of the invention to provide an improved papermaking fabric having greater strength and longer felt life.

It is another object of the invention to provide a papermaker's fabric which remains stable on the papermaking machine.

It is another object of the invention to provide a papermaker's fabric which limits expansion upon exposure to water.

It is yet another object of the invention to provide a papermaker's fabric which does not shift or widen upon installation on the paper machine.

SUMMARY OF THE INVENTION

The invention accomplishes the objects set forth above by providing a papermaker's fabric having a layer of spun bonded material needled into place using a layer of fibers. To facilitate handling during the needling operation, the spun bonded material may first be adhered to the base fabric using adhesives, low melts, or ultrasonic methods.

The spun bonded material may be placed in any one of a number of possible locations in the fabric, depending upon the felt stratification desired. For example, it may be attached to the upper surface (or paper contacting side) of the base fabric layer; to the lower surface (or machine contacting side) of the base fabric layer; between two base fabric layers, in the case of a laminated felt; between layers of fibers; or in any other desired location.

Since the spun bonded material is a continuous filament, it provides greater strength than the conventional needled batt, and with the proper selection of materials (e.g. polyester or polypropylene) it has low moisture take-up, and thus provides stability under wet conditions and prevents the fabric from shifting and/or expanding upon exposure to water. As a result, the felt is more predictable on the paper machine and better able to produce a superior product. The spun bonded material is an open mesh of fibers, though continuous, thus it does not restrict the drainage properties of the felt.

The invention may also be seen from the following detailed description of the invention and from the following drawing, in which like reference numbers refer to like members in the various figures.

DETAILED DESCRIPTION OF THE PREFERRED EMBODIMENT

Figure 1:
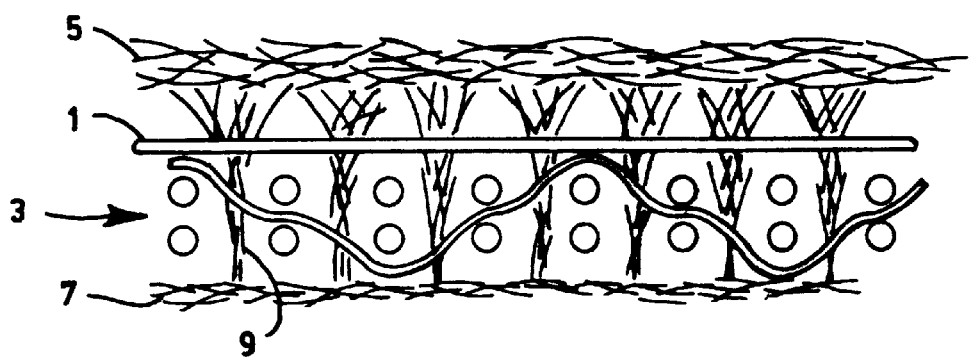
FIG. 1 is a cross sectional view of a first embodiment of the invention.
Figure 2:
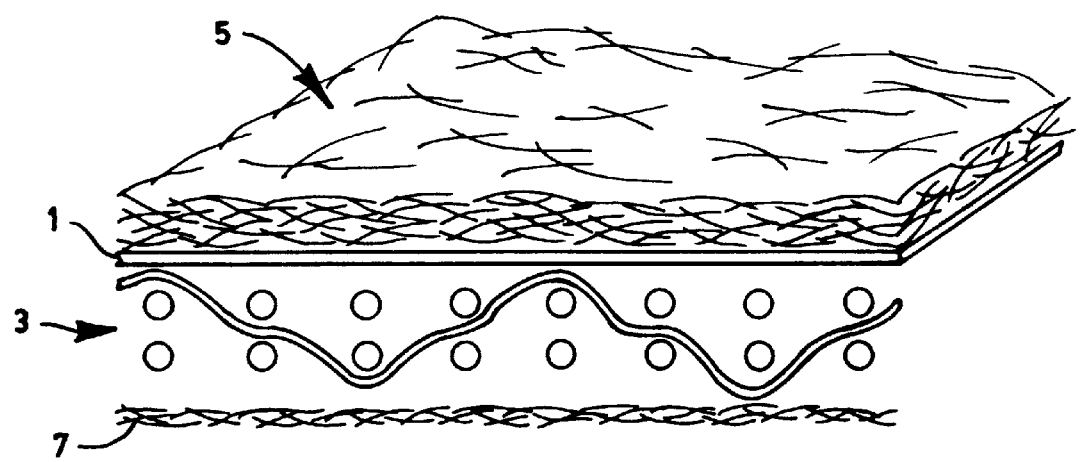
FIG. 2 is an exploded view of the fabric shown in FIG. 1.

FIG. 1 shows a first embodiment of a papermaker's fabric according to the present invention. FIG. 2 is an exploded view of the fabric shown in FIG. 1. The papermaker's fabric includes a base fabric layer 3, a layer of spun bonded material 1, a top layer of nylon fibers 5, and a bottom layer of nylon fibers 7. A woven base fabric layer 3 is shown, although the base fabric layer 3 may be non-woven for the purpose of this invention. The spun bonded material 1 is placed on the upper surface of the base fabric layer 3 and needled into place with fibers 9 which extend from the top layer of fibers 5 through the spun bonded material 1 and the base fabric layer 3, into the bottom layer of nylon fibers 7, as shown in FIG. 1.

Figure 3:
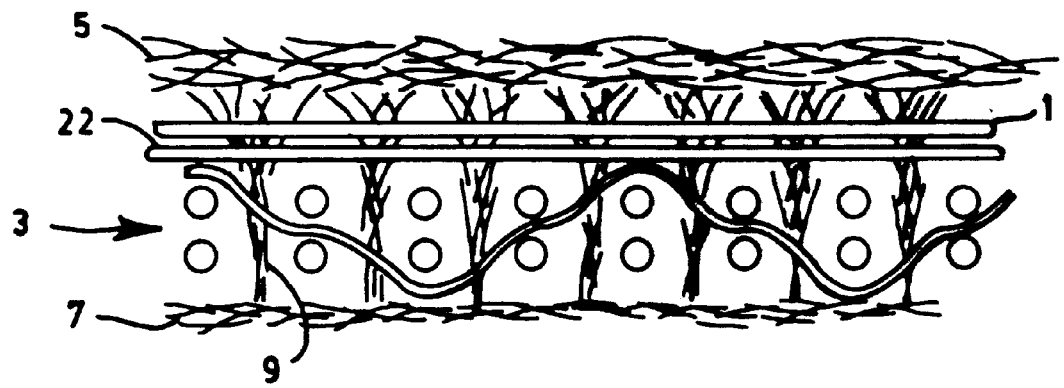
FIG. 3 is a cross sectional view of another embodiment of the present invention.

To facilitate handling during needling, the spun bonded material 1 may first be adhered to the base fabric 3 with adhesives, low melts or ultrasonic methods. When adhesives are used, a chemical adhesive 22 is applied to the base fabric 3 in a paste form or as an epoxy. (FIG. 3) The layer of spun bonded material 1 is then adhered to the chemical adhesive 22, and the entire structure is cured. During the curing process, the chemical adhesive becomes tacky, bonds the spun bonded material to the base fabric layer 1 and shrinks away from the opening in the base fabric and the spun bonded material to maintain contact only at the fibers of the base fabric 3 and the non-void spaces of the bonded material 1.

Figure 4:
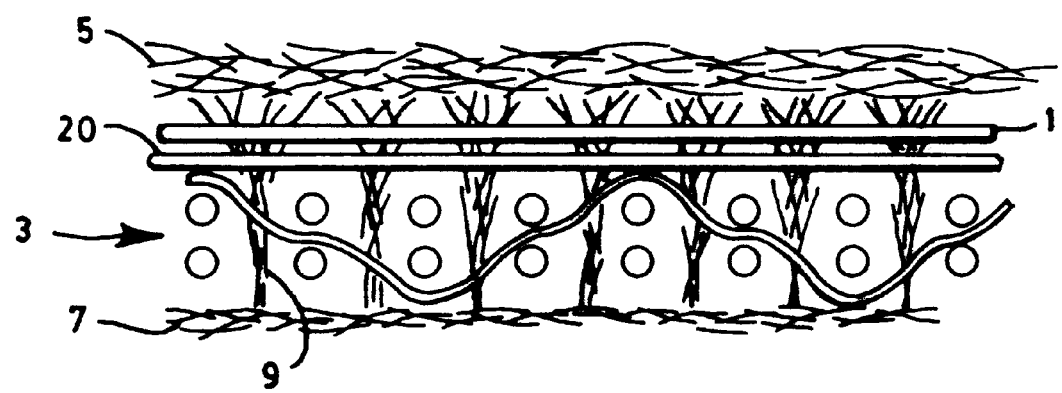
FIG. 4 is a cross sectional view of another embodiment of the present invention.

FIG. 4 shows a cross section of a fabric in which a low melt polymer 20 is used to adhere the spun bonded material 1 to the base fabric layer 3 prior to needling. A polymer 20, having a relatively low melting point, such as a copolymer blend of polyamide or polyethylene, is applied between the base fabric layer 3 and the layer of spun bonded material 1 in the form of a powder or molten epoxy. The entire structure is cured. The curing process melts the relatively low melting point polymer 20 and the melted polymer 20 binds to both the spun bonded material 1 and the base fabric layer 3, thereby joining the two.

Ultrasonic guns may also be used to adhere the layer of spun bonded material 1 to the base fabric layer 3. When this method is used, ultrasonic guns vibrating at a high frequency are placed in contact with the base fabric layer. This causes energy to be transferred from the guns to the fibers, whereby the fibers are melted.

The location of the spun bonded material in the felt depends upon the stratification desired. For example, it may be attached to the upper surface (or paper contacting side) of the base fabric layer (FIGS. 1, 2, 3, 4 and 11); to the lower surface (or machine contacting side) of the base fabric layer (FIGS. 9, 12 and 13); between two base fabric layers (FIG. 10), in the case of a laminated felt; between layers of fibers (FIG. 5); on top of a layer of fibers (FIGS. 6–8); or in any other desired location.

Figure 6:
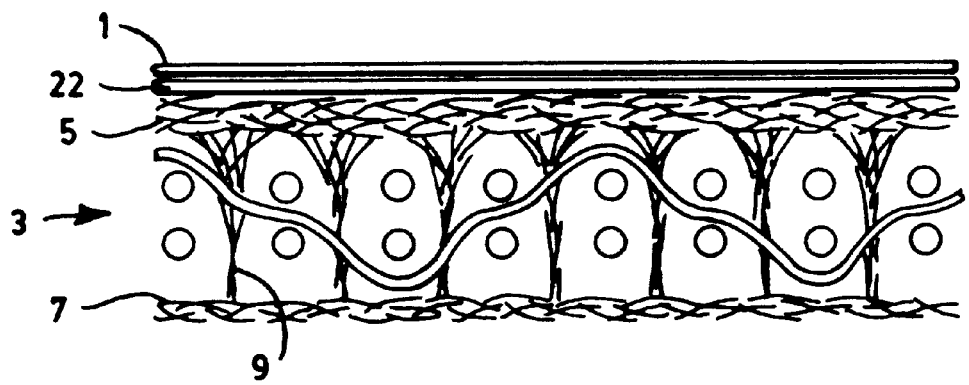
FIG. 6 is a cross sectional view of another embodiment of the present invention.
Figure 7:
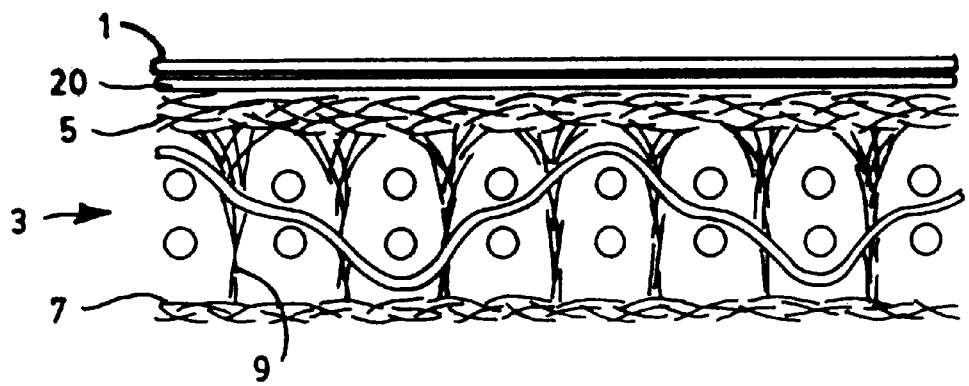
FIG. 7 is a cross sectional view of another embodiment of the present invention.
Figure 8:
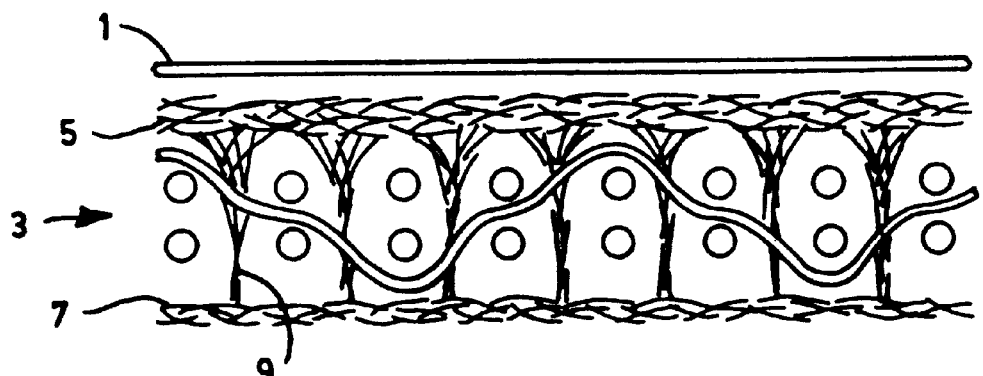
FIG. 8 is a cross sectional view of another embodiment of the present invention.

FIGS. 5–8 show fabrics in which the layer of spun bonded material 1 is attached to the upper surface of the top layer of fibers 5. The layer of spun bonded material 1 may be attached through the needling process (FIG. 5) or by use of adhesives (FIG. 6), low melts (FIG. 7), or ultrasonic methods (FIG. 8).

Figure 5:
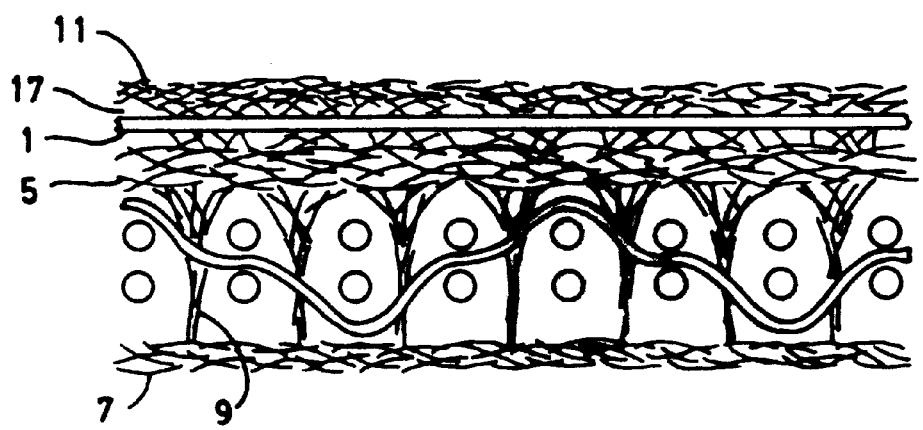
FIG. 5 is a cross sectional view of another embodiment of the present invention.

In the embodiment shown in FIG. 5 an additional layer of fibers 11 is placed on the upper surface of the layer of spun bonded material 1. Fibers 17 from the layer of fibers 11 extend through the spun bonded material 1 into the layer of fibers 5.

In the embodiment shown in FIG. 6, the spun bonded material is attached to the upper surface of the top layer of fibers 5 using adhesives 22. The adhesive 22 is applied to the top layer of fibers 5 in a paste form or as an epoxy. The layer of spun bonded material is then adhered to adhesive 22 and the entire structure is cured. During the curing process, the chemical adhesive 22 becomes tacky, bonds the spun bonded material 1 to the layer of fibers 5 and shrinks away from the opening in layer of fibers 5 and the spun bonded material 1 to maintain contact only at the fibers of the top layer of fibers 5 and the non-void spaces of the bonded material 1.

In the embodiment shown in FIG. 7, a polymer 20 having a relatively low melting point, such as a copolymer blend of polyamide or polyethylene, is used to attach the layer of spun bonded material 1 to the layer of fibers 9. The relatively low melting point polymer 20 is applied between the layer of fibers 9 and the layer of spun bonded material 1 in either the form of a powder or via molten epoxy. The entire structure is then cured. The curing process melts the relatively low melting point polymer 20, and the melted polymer 20 binds to both the spun bonded material 1 and the layer of fibers 5, thereby joining the two.

In the embodiment shown in FIG. 8, ultrasonic methods are used to attach the spun bonded material to the upper surface of the top layer of fibers 5. Ultrasonic guns vibrating at a high frequency are placed in contact with the batt fibers. This causes energy to be transferred from the guns to the fibers, whereby the fibers are melted.

Figure 9:
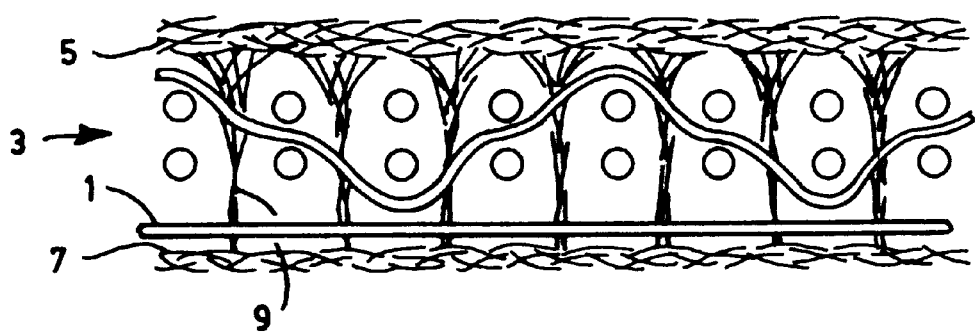
FIG. 9 is a cross sectional view of another embodiment of the present invention.

FIG. 9 shows another embodiment of the invention in which the layer of spun bonded material 1 is attached to the lower surface, or machine contacting side of the base fabric 3. The spun bonded material 1 is needled into place with fibers 9 which extend from the top layer of fibers 5 through the base fabric 3 and the spun bonded material 1 into the bottom layer of fibers 7.

Figure 10:
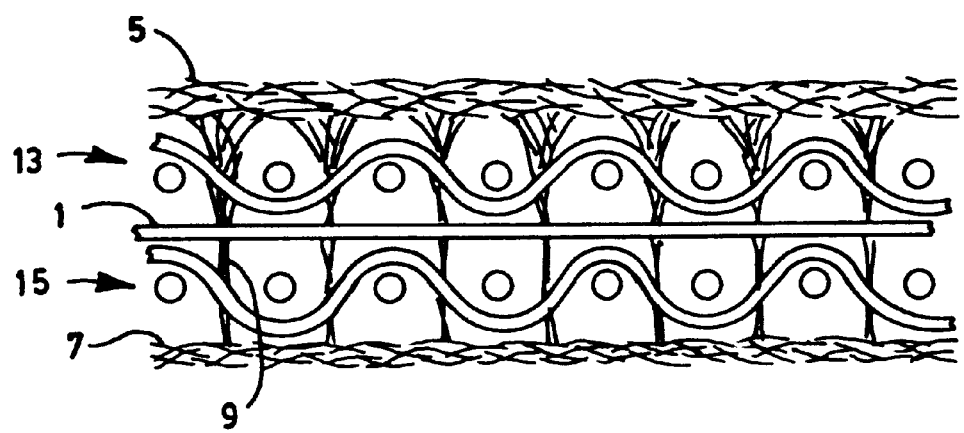
FIG. 10 is a cross sectional view of another embodiment of the present invention.

FIG. 10 shows another embodiment of the invention, a laminated felt, in which a layer of spun bonded material 1 is placed between top and bottom base fabric layers, 13 and 15. A layer of fibers 5 is placed on the upper surface of the top base fabric layer 13, and fibers 9 from the top layer of fibers 5 extend through the top base fabric layer 13, through the layer of spun bonded material 1 and through the bottom base fabric 15, into a lower layer of nylon fibers 7. Additional layers may be included.

Figure 11:
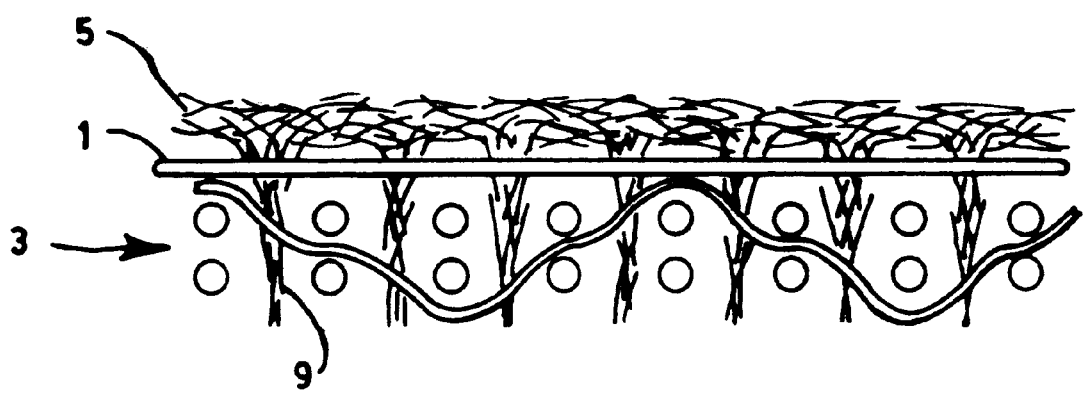
FIG. 11 is a cross sectional view of another embodiment of the present invention.
Figure 12:
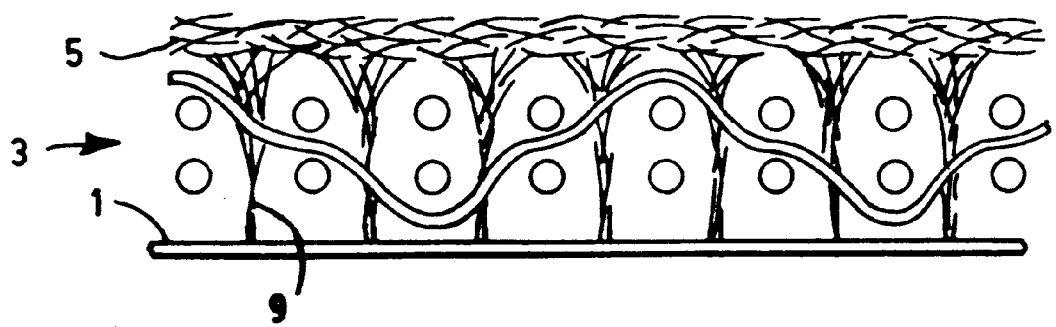
FIG. 12 is a cross sectional view of another embodiment of the present invention.
Figure 13:
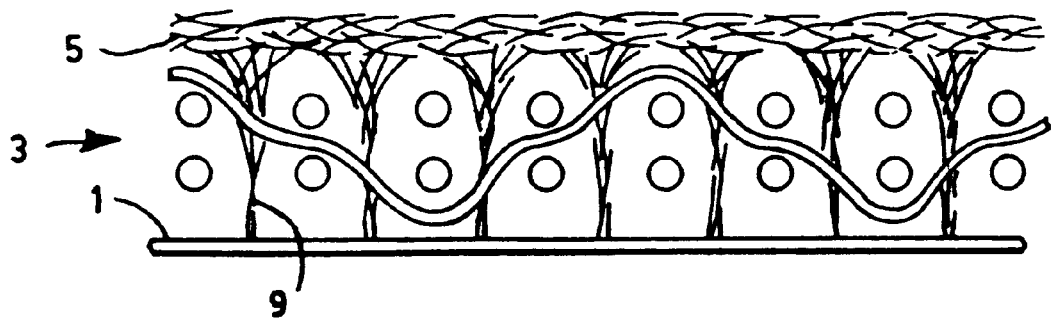
FIG. 13 is a cross sectional view of another embodiment of the present invention.

In the embodiments described above, fibers are needled from the top layer of fibers 5 to a bottom layer of fibers 7 to help ensure proper anchoring of the top layer of fibers 5. However, the bottom layer of fibers 7 may be eliminated, and fibers 9 from the top layer of fibers 9 may be needled directly to the base fabric layer 3. In FIG. 11, for example, fibers 9 from the top layer of fibers 5 extend through the layer of spun bonded material 1 into the base fabric layer 3. In FIG. 12, the layer of spun bonded material 1 is attached to the bottom surface, or machine contacting side, of the base fabric layer 3, and fibers 9 from the top layer of fibers 5 extend into the base fabric layer 3. The layer of spun bonded material 1 may be attached to the bottom surface of the base fabric 3 by use of adhesives, low melts, or ultrasonic methods, or through the use of needling. FIG. 13 shows a fabric in which the spun bonded material is attached to the bottom surface of the base fabric layer 3 through the use of needling. Fibers 9 extend from the layer of fibers 9 through the base fabric layer 3 to the spun bonded material 1.

As is well known to one of ordinary skill in the art, the drainage characteristics of a papermaking fabric greatly affect the quality and type of paper produced on that fabric. These characteristics include the amount of void space per surface area, the amount of void volume per volume of fabric, the average area of a clear path straight through the papermaker's fabric, the relative percentage of fabric area contacting the paper as it relates to the total area of the paper, etc. One of ordinary skill in the art is able to choose the proper configuration of the papermaker's fabric depending upon desired paper characteristics. The spun bonded material may be any material having a low moisture take up, high tenacity and good fibrillation and wear resistance. One suitable material is a polyester in the denier range of 40–3 and a weight of 50–200 gsm. The spun bonded material does not impede drainage to any great extent because it is a fibrous web, which is porous.

The yarns making up the base fabric will be those known in the art. For example, the yarns may be spun yarns, monofilaments yarns, multifilament yarns or even monofilament or multifilament twist yarns. The yarns may be produced from wool, cotton, polyolefins, polyamides, polyesters, mixtures thereof and the like.

The invention may be embodied in other specific forms without departing from the spirit or essential characteristics thereof. For example, the spun bonded material may be used in any location of a papermaker's fabric, and any method or combination of methods of attachment may bp used. In addition, the invention may be used with any type of press felts, including single layer felts, or laminated felts. The base fabric may be a single layer, double layer, or multi-layer fabrics, and the spun bonded material may be placed in any location in the felt, depending upon the stratification desired.

The present embodiments are therefore to be considered in all respects as illustrative and not restrictive, the scope of the invention being indicated by the appended claims rather than by the foregoing description, and there is no intention to exclude any equivalents thereof. Hence, it is recognized that various modifications are possible within the scope of the present invention as claimed.

What is claimed is:

1. A papermaker's fabric for use in the press section of a papermaker's machine comprising:
    a base fabric layer having a machine contacting surface and an opposed paper facing surface;
    a first layer of batt needled to the paper facing surface of the base fabric layer; and
    a layer of spun bonded material attached to the first layer of batt such that one surface of said spun bonded material is exposed and serves as the papermaking surface of said papermaker's fabric.

2. The papermaker's fabric of claim 1 further comprising a second layer of batt attached to an exposed surface of the layer of spun bonded material.

3. The papermaker's fabric of claim 2 wherein yarns from the second layer of batt are needled through the layer of spun bonded material to the first layer of batt.

4. The papermaker's fabric of claim 2 further comprising a third layer of batt wherein yarns from the first layer of batt extend through the base fabric layer to the third layer of batt.

5. A papermaker's fabric for use in the press section of a papermaker's machine comprising:
    a base fabric layer having a machine facing surface and a paper contacting surface;
    a first layer of batt needled to the paper contacting surface of the base fabric layer; and
    a layer of spun bonded material attached to the machine facing surface of the base fabric layer such that one surface of said spun bonded material is exposed and serves as the machine contacting surface of said papermaker's fabric.

6. The papermaker's fabric of claim 5 further comprising a second layer of batt adjacent the layer of spun bonded material wherein the first layer of batt is needled through the base fabric layer and the layer of spun bonded material to the second layer of batt.

7. A papermaker's fabric for use in the press section of a papermaker's machine, comprising:
    two woven base fabric layers;
    a layer of spun bonded material placed between the two base fabric layers;
    and at least one layer of batt overlying at least one of said two base fabric layers and said spun bonded layer;
    said base fabric layers, said spun bonded layer, and said batt layer being needled to form a unitary fabric structure.

8. The papermaker's fabric of claim 7 wherein a first layer of batt is needled through the top base fabric layer and the layer of spun bonded material to the bottom base fabric layer.

9. The papermaker's fabric of claim 7 wherein a first layer of batt is needled through the top base fabric layer, the layer of spun bonded material, and the bottom base fabric layer, to a second layer of batt.

10. A method of manufacturing a papermaker's fabric for use in the press section of a papermaker's machine comprising the steps of:
    providing a base fabric layer having a machine contacting surface and a paper facing surface;
    needling a first layer of batt to the paper facing surface of the base fabric layer: and
    attaching a layer of spun bonded material to the first layer of batt such that one surface of said spun bonded layer is exposed and serves as the papermaking surface of said papermaker's fabric.

11. The method of manufacturing a papermaker's fabric of claim 10 further comprising the steps of providing a second layer of batt on an upper surface of the layer of spun bonded material, and needling the second layer of batt to the layer of spun bonded material.

12. The method of manufacturing a papermaker's fabric of claim 11 wherein the second layer of batt is needled through the layer of spun bonded material to the first layer of batt.

13. The method of manufacturing the papermaker's fabric of claim 10 wherein the layer of spun bonded material is attached to the base fabric using adhesives.

14. The method of manufacturing the papermaker's fabric of claim 10 wherein the layer of spun bonded material is attached to the base fabric using low melt polymer material.

15. The method of manufacturing the papermaker's fabric of claim 10 wherein the layer of spun bonded material is attached to the base fabric using ultrasonic methods.

16. A method of manufacturing a papermaker's fabric for use in the press section of a papermaker's machine comprising the steps of:

providing a base layer having a machine facing surface and a paper contacting surface;

needling a first layer of batt to the paper contacting surface of the base fabric layer; and attaching a layer of spun bonded material to the machine facing surface of the base fabric layer such that one surface of said spun bonded material is exposed and serves as the machine contacting surface of said papermaker's fabric.

17. The method of manufacturing a papermaker's fabric of claim 16 wherein the first layer of batt is needled through the base fabric layer and the layer of spun bonded material to a secbnd layer of batt.

18. A method of manufacturing a papermaker's fabric for use in the press section of a papermaker's machine comprising the steps of:

providing two woven base fabric layers;

providing a layer of spun bonded material between the two base fabric layers;

providing at least one layer of batt;

positioning the base fabric layers, the spun bonded layer and the batt layer in stacked and overlying relationship; and needling the two base fabric layers, the layer of spun bonded material, and the at least one layer of batt.

19. The method of manufacturing a papermaker's fabric of claim 18 wherein the first layer of batt is needled through the top base fabric layer and the layer of spun bonded material to the bottom base fabric layer.

20. The method of manufacturing a papermaker's fabric of claim 19 wherein the first layer of batt is needled through the top base fabric, the layer of spun bonded material, and the bottom base fabric, to a second layer of batt.

* * * * *

UNITED STATES PATENT AND TRADEMARK OFFICE
CERTIFICATE OF CORRECTION

PATENT NO.    :    5,945,358
DATED         :    August 31, 1999
INVENTOR(S)   :    René Marchand It is certified that error appears in the above-identified patent and that said Letters Patent is hereby corrected as shown below:

--

Claim 17, column 7, line 25 correct "secbnd' to read --second--.

Signed and Sealed this

Twenty-fifth Day of July, 2000

Attest:

Q. TODD DICKINSON

Attesting Officer

Director of Patents and Trademarks